United States Patent
Hamanaka et al.

(10) Patent No.: US 9,849,730 B2
(45) Date of Patent: *Dec. 26, 2017

(54) PNEUMATIC TIRE

(71) Applicant: The Yokohama Rubber Co., LTD., Minato-ku, Tokyo (JP)

(72) Inventors: Hideki Hamanaka, Hiratsuka (JP); Koshi Iga, Hiratsuka (JP); Koichi Kotoku, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/405,146

(22) PCT Filed: Jun. 7, 2013

(86) PCT No.: PCT/JP2013/068843
§ 371 (c)(1),
(2) Date: Dec. 2, 2014

(87) PCT Pub. No.: WO2014/010349
PCT Pub. Date: Jan. 16, 2014

(65) Prior Publication Data
US 2015/0114536 A1   Apr. 30, 2015

(30) Foreign Application Priority Data

Jul. 13, 2012  (WO) ............... PCT/JP2012/068025
Jul. 13, 2012  (WO) ............... PCT/JP2012/068026
Jul. 13, 2012  (WO) ............... PCT/JP2012/068027

(51) Int. Cl.
*B60C 9/20*   (2006.01)
*B60C 9/22*   (2006.01)
(Continued)

(52) U.S. Cl.
CPC ............ *B60C 9/20* (2013.01); *B60C 3/04* (2013.01); *B60C 9/18* (2013.01); *B60C 9/185* (2013.01);
(Continued)

(58) Field of Classification Search
CPC ..... B60C 9/20; B60C 9/22; B60C 2009/2022; B60C 2009/1878
See application file for complete search history.

(56) References Cited

U.S. PATENT DOCUMENTS 3,557,858 A    1/1971  Lugli
3,939,890 A *  2/1976  Abe .................. B60C 11/00
                                              152/209.13
(Continued)

FOREIGN PATENT DOCUMENTS

CN   101531121    9/2009
DE   1 680 467    11/1971
(Continued)

OTHER PUBLICATIONS

International Search Report for International Application No. PCT/JP2013/065843 dated Jul. 9, 2013, 4 pages, Japan.
(Continued)

*Primary Examiner* — Michael H Wilson
*Assistant Examiner* — Robert Dye
(74) *Attorney, Agent, or Firm* — Thorpe North & Western

(57) ABSTRACT

A pneumatic tire includes a carcass layer, a belt layer that is disposed on the outer side in the tire radial direction of the carcass layer, and a tread rubber that is disposed on the outer side in the tire radial direction of the belt layer. The pneumatic tire also includes at least three circumferential main grooves extending in the tire circumferential direction, and a plurality of land portions that are defined by these circumferential main grooves. The belt layer includes an (Continued)

inner-side cross belt and outer-side cross belt having belt angles of not less than 51° and not more than 80° as absolute values with respect to the tire circumferential direction, the belt angles having mutually opposite signs, and a circumferential reinforcing layer having a belt angle that satisfies a range of ±5° with respect to the tire circumferential direction.

14 Claims, 11 Drawing Sheets

(51) Int. Cl.
| | |
|---|---|
| B60C 9/28 | (2006.01) |
| B60C 11/00 | (2006.01) |
| B60C 11/13 | (2006.01) |
| B60C 3/04 | (2006.01) |
| B60C 9/18 | (2006.01) |
| B60C 11/03 | (2006.01) |

(52) U.S. Cl.
CPC .............. *B60C 9/2006* (2013.01); *B60C 9/22* (2013.01); *B60C 9/28* (2013.01); *B60C 11/0083* (2013.01); *B60C 11/03* (2013.01); *B60C 11/0306* (2013.01); *B60C 11/1392* (2013.01); *B60C 2009/2012* (2013.01); *B60C 2009/2016* (2013.01); *B60C 2009/2019* (2013.01); *B60C 2009/2022* (2013.01); *B60C 2009/2041* (2013.01); *B60C 2009/2061* (2013.01); *B60C 2009/2064* (2013.01); *B60C 2009/2077* (2013.01); *B60C 2009/2083* (2013.01); *B60C 2009/283* (2013.01); *Y10T 152/10801* (2015.01)

(56) References Cited

U.S. PATENT DOCUMENTS

| | | | | |
|---|---|---|---|---|
| 4,215,734 A | * | 8/1980 | Suzuki | B60C 9/18 152/209.1 |
| 4,688,615 A | * | 8/1987 | Lee | B60C 9/2009 152/531 |
| 4,724,878 A | * | 2/1988 | Kabe | B60C 11/00 152/209.14 |
| 4,930,559 A | | 6/1990 | Takehara et al. | |
| 5,337,162 A | | 8/1994 | Sakano | |
| 5,637,162 A | * | 6/1997 | Rhyne | B60C 3/04 152/209.14 |
| 5,674,331 A | * | 10/1997 | Saeki | B60C 9/18 152/209.5 |
| 6,401,780 B1 | * | 6/2002 | Patitsas | B60C 1/00 152/532 |
| 6,659,147 B1 | * | 12/2003 | Cordonnier | B60C 9/22 152/526 |
| 9,259,971 B2 | * | 2/2016 | Hamanaka | B60C 11/0083 |
| 2004/0069392 A1 | * | 4/2004 | Maruoka | B60C 3/04 152/454 |
| 2006/0169380 A1 | | 8/2006 | Radulescu et al. | |
| 2006/0169381 A1 | | 8/2006 | Radulescu et al. | |
| 2006/0169383 A1 | | 8/2006 | Radulescu et al. | |
| 2009/0229722 A1 | | 9/2009 | Isobe | |
| 2009/0277552 A1 | | 11/2009 | Maruyama et al. | |
| 2010/0024947 A1 | * | 2/2010 | Miyazaki | C08K 5/34922 152/532 |
| 2010/0108226 A1 | * | 5/2010 | Matsumoto | B60C 9/2009 152/528 |
| 2011/0192516 A1 | | 8/2011 | Yamaguchi et al. | |
| 2013/0136135 A1 | | 5/2013 | Baus et al. | |
| 2014/0166178 A1 | | 6/2014 | Sato | |
| 2014/0196826 A1 | | 7/2014 | Kobayashi | |
| 2014/0305566 A1 | | 10/2014 | Mashiyama | |
| 2014/0345766 A1 | | 11/2014 | Wang | |

FOREIGN PATENT DOCUMENTS

| | | |
|---|---|---|
| EP | 0 297 889 | 1/1989 |
| JP | 2000-177316 A | 6/2000 |
| JP | 2006/111217 | 4/2006 |
| JP | 2006/183211 | 7/2006 |
| JP | 2009/001092 | 1/2009 |
| JP | 2009-073245 | 4/2009 |
| JP | 4642760 | 3/2011 |
| JP | 4642760 | 4/2011 |
| JP | 4663638 | 4/2011 |
| JP | 4663639 | 4/2011 |
| JP | 4911267 | 4/2012 |
| JP | 4918948 | 4/2012 |
| JP | 4952864 | 6/2012 |
| JP | 4973810 | 7/2012 |
| JP | 2013-526225 | 6/2013 |
| WO | WO 2005/016666 | 2/2005 |
| WO | WO 2005/016667 | 2/2005 |
| WO | WO 2005/016668 | 2/2005 |
| WO | WO 2008/093537 | 8/2008 |
| WO | WO 2010/041720 | 4/2010 |
| WO | WO 2011/138061 | 11/2011 |

OTHER PUBLICATIONS

Chinese Office Action for Chinese Patent Application No. 201380030179.9 dated Sep. 26, 2016, 7 pages.

* cited by examiner

| | CONVENTIONAL EXAMPLE | COMPARATIVE EXAMPLE | WORKING EXAMPLE 1 | WORKING EXAMPLE 2 | WORKING EXAMPLE 3 | WORKING EXAMPLE 4 |
|---|---|---|---|---|---|---|
| Presence of circumferential reinforcing layer | None | Yes | Yes | Yes | Yes | Yes |
| Belt angle of cross belt [deg] | 20 | 18 | 51 | 60 | 70 | 80 |
| Position of circumferential reinforcing layer relative to cross belts | — | Between | Between | Between | Between | Between |
| Presence of high-angle belt | Yes | Yes | None | None | None | None |
| Gsh/Gcc | 1.08 | 1.24 | 1.24 | 1.24 | 1.24 | 1.24 |
| De/Dcc | 1.03 | 1.00 | 1.00 | 1.00 | 1.00 | 1.00 |
| Wb2/Wca | 0.70 | 0.70 | 0.70 | 0.70 | 0.70 | 0.70 |
| Ws/Wca | — | 0.75 | 0.75 | 0.75 | 0.75 | 0.75 |
| TW/SW | 0.87 | 0.87 | 0.87 | 0.87 | 0.87 | 0.87 |
| Yd/Ya | — | 0.90 | 0.90 | 0.90 | 0.90 | 0.90 |
| Es/E2 | — | 0.80 | 0.80 | 0.80 | 0.80 | 0.80 |
| Es/E3 | — | 0.80 | 0.80 | 0.80 | 0.80 | 0.80 |
| λs[%] | — | 150 | 150 | 150 | 150 | 150 |
| λ2[%] | 150 | 150 | 150 | 150 | 150 | 150 |
| λ3[%] | 150 | 150 | 150 | 150 | 150 | 150 |
| Ebc [MPa] | 12 | 12 | 12 | 12 | 12 | 12 |
| λbc [%] | 300 | 300 | 300 | 300 | 300 | 300 |
| TW/Wca | 0.93 | 0.93 | 0.93 | 0.93 | 0.93 | 0.93 |
| Belt durability | 100 | 102 | 106 | 107 | 106 | 104 |

FIG. 7A

|  | WORKING EXAMPLE 5 | WORKING EXAMPLE 6 | WORKING EXAMPLE 7 | WORKING EXAMPLE 8 | WORKING EXAMPLE 9 | WORKING EXAMPLE 10 | WORKING EXAMPLE 11 |
|---|---|---|---|---|---|---|---|
| Presence of circumferential reinforcing layer | Yes | Yes | Yes | Yes | Yes | Yes | Yes |
| Belt angle of cross belt [deg] | 60 | 60 | 60 | 60 | 60 | 60 | 60 |
| Position of circumferential reinforcing layer relative to cross belts | Inner side | Outer side | Between | Between | Between | Between | Between |
| Presence of high-angle belt | None | None | None | None | None | None | None |
| Gsh/Gcc | 1.24 | 1.24 | 1.20 | 1.10 | 1.06 | 1.06 | 1.06 |
| De/Dcc | 1.00 | 1.00 | 1.00 | 1.00 | 1.00 | 0.95 | 1.05 |
| Wb2/Wca | 0.70 | 0.70 | 0.70 | 0.70 | 0.70 | 0.70 | 0.70 |
| Ws/Wca | 0.75 | 0.75 | 0.75 | 0.75 | 0.75 | 0.75 | 0.75 |
| TW/SW | 0.87 | 0.87 | 0.87 | 0.87 | 0.87 | 0.87 | 0.87 |
| Yd/Ya | 0.90 | 0.90 | 0.90 | 0.90 | 0.90 | 0.90 | 0.90 |
| Es/E2 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 |
| λs[%] | 150 | 150 | 150 | 150 | 150 | 150 | 150 |
| λ2[%] | 150 | 150 | 150 | 150 | 150 | 150 | 150 |
| λ3[%] | 150 | 150 | 150 | 150 | 150 | 150 | 150 |
| Ebc [MPa] | 1.2 | 1.2 | 1.2 | 1.2 | 1.2 | 1.2 | 1.2 |
| λbc [%] | 300 | 300 | 300 | 300 | 300 | 300 | 300 |
| TW/Wca | 0.93 | 0.93 | 0.93 | 0.93 | 0.93 | 0.93 | 0.93 |
| Belt durability | 105 | 105 | 108 | 109 | 110 | 109 | 109 |

FIG. 7B

|  | WORKING EXAMPLE 12 | WORKING EXAMPLE 13 | WORKING EXAMPLE 14 | WORKING EXAMPLE 15 | WORKING EXAMPLE 16 | WORKING EXAMPLE 17 | WORKING EXAMPLE 18 |
|---|---|---|---|---|---|---|---|
| Presence of circumferential reinforcing layer | Yes | Yes | Yes | Yes | Yes | Yes | Yes |
| Belt angle of cross belt [deg] | 60 | 60 | 60 | 60 | 60 | 60 | 60 |
| Position of circumferential reinforcing layer relative to cross belts | Between | Between | Between | Between | Between | Between | Between |
| Presence of high-angle belt | None | None | None | None | None | None | None |
| Gsh/Gcc | 1.06 | 1.06 | 1.06 | 1.06 | 1.06 | 1.06 | 1.06 |
| De/Dcc | 1.00 | 1.00 | 1.00 | 1.00 | 1.00 | 1.00 | 1.00 |
| Wb2/Wca | 0.73 | 0.80 | 0.89 | 0.80 | 0.80 | 0.80 | 0.80 |
| Ws/Wca | 0.75 | 0.75 | 0.75 | 0.60 | 0.65 | 0.70 | 0.65 |
| TW/SW | 0.87 | 0.87 | 0.87 | 0.87 | 0.87 | 0.87 | 0.83 |
| Yd/Ya | 0.90 | 0.90 | 0.90 | 0.90 | 0.90 | 0.90 | 0.90 |
| Es/E2 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 |
| λs[%] | 150 | 150 | 150 | 150 | 150 | 150 | 150 |
| λ2[%] | 150 | 150 | 150 | 150 | 150 | 150 | 150 |
| λ3[%] | 150 | 150 | 150 | 150 | 150 | 150 | 150 |
| Ebc [MPa] | 1.2 | 1.2 | 1.2 | 1.2 | 1.2 | 1.2 | 1.2 |
| λbc [%] | 300 | 300 | 300 | 300 | 300 | 300 | 300 |
| TW/Wca | 0.93 | 0.93 | 0.93 | 0.93 | 0.93 | 0.93 | 0.93 |
| Belt durability | 110 | 112 | 110 | 113 | 115 | 113 | 114 |

FIG. 8A

| | WORKING EXAMPLE 19 | WORKING EXAMPLE 20 | WORKING EXAMPLE 21 | WORKING EXAMPLE 22 | WORKING EXAMPLE 23 | WORKING EXAMPLE 24 | WORKING EXAMPLE 25 |
|---|---|---|---|---|---|---|---|
| Presence of circumferential reinforcing layer | Yes | Yes | Yes | Yes | Yes | Yes | Yes |
| Belt angle of cross belt [deg] | 60 | 60 | 60 | 60 | 60 | 60 | 60 |
| Position of circumferential reinforcing layer relative to cross belts | Between | Between | Between | Between | Between | Between | Between |
| Presence of high-angle belt | None | None | None | None | None | None | None |
| Gsh/Gcc | 1.06 | 1.06 | 1.06 | 1.06 | 1.06 | 1.06 | 1.06 |
| De/Dcc | 1.00 | 1.00 | 1.00 | 1.00 | 1.00 | 1.00 | 1.00 |
| Wb2/Wca | 0.80 | 0.80 | 0.80 | 0.80 | 0.80 | 0.80 | 0.80 |
| Ws/Wca | 0.65 | 0.65 | 0.65 | 0.65 | 0.65 | 0.65 | 0.65 |
| TW/SW | 0.87 | 0.87 | 0.87 | 0.87 | 0.87 | 0.87 | 0.87 |
| Yd/Ya | 0.95 | 0.95 | 0.98 | 1.00 | 0.98 | 0.98 | 0.98 |
| Es/E2 | 0.80 | 0.80 | 0.80 | 0.80 | 0.90 | 1.00 | 1.10 |
| Es/E3 | 0.80 | 0.80 | 0.80 | 0.80 | 0.90 | 1.00 | 1.10 |
| λs[%] | 150 | 150 | 150 | 150 | 150 | 150 | 150 |
| λ2[%] | 150 | 150 | 150 | 150 | 150 | 150 | 150 |
| λ3[%] | 150 | 150 | 150 | 150 | 150 | 150 | 150 |
| Ebc [MPa] | 1.2 | 1.2 | 1.2 | 1.2 | 1.2 | 1.2 | 1.2 |
| Abc [%] | 300 | 300 | 300 | 300 | 300 | 300 | 300 |
| TW/Wca | 0.93 | 0.93 | 0.93 | 0.93 | 0.93 | 0.93 | 0.93 |
| Belt durability | 113 | 116 | 119 | 118 | 120 | 121 | 120 |

FIG. 8B

| | WORKING EXAMPLE 26 | WORKING EXAMPLE 27 | WORKING EXAMPLE 28 | WORKING EXAMPLE 29 | WORKING EXAMPLE 30 | WORKING EXAMPLE 31 |
|---|---|---|---|---|---|---|
| Presence of circumferential reinforcing layer | Yes | Yes | Yes | Yes | Yes | Yes |
| Belt angle of cross belt [deg] | 60 | 60 | 60 | 60 | 60 | 60 |
| Position of circumferential reinforcing layer relative to cross belts | Between | Between | Between | Between | Between | Between |
| Presence of high-angle belt | None | None | None | None | None | None |
| Gsh/Gcc | 1.06 | 1.06 | 1.06 | 1.06 | 1.06 | 1.06 |
| De/Dcc | 1.00 | 1.00 | 1.00 | 1.00 | 1.00 | 1.00 |
| Wb2/Wca | 0.80 | 0.80 | 0.80 | 0.80 | 0.80 | 0.80 |
| Ws/Wca | 0.65 | 0.65 | 0.65 | 0.65 | 0.65 | 0.65 |
| TW/SW | 0.87 | 0.87 | 0.87 | 0.87 | 0.87 | 0.87 |
| Yd/Ya | 0.98 | 0.98 | 0.98 | 0.98 | 0.98 | 0.98 |
| Es/E2 | 1.00 | 1.00 | 1.00 | 1.00 | 1.00 | 1.00 |
| Es/E3 | 1.00 | 1.00 | 1.00 | 1.00 | 1.00 | 1.00 |
| λs[%] | 200 | 250 | 250 | 250 | 250 | 250 |
| λ2[%] | 150 | 150 | 200 | 250 | 250 | 250 |
| λ3[%] | 150 | 150 | 200 | 250 | 250 | 250 |
| Ebc [MPa] | 1.2 | 1.2 | 1.2 | 1.2 | 1.5 | 2.3 |
| λbc [%] | 300 | 300 | 300 | 300 | 300 | 300 |
| TW/Wca | 0.93 | 0.93 | 0.93 | 0.93 | 0.93 | 0.93 |
| Belt durability | 123 | 125 | 127 | 129 | 130 | 132 |

| | WORKING EXAMPLE 32 | WORKING EXAMPLE 33 | WORKING EXAMPLE 34 | WORKING EXAMPLE 35 | WORKING EXAMPLE 36 |
|---|---|---|---|---|---|
| Presence of circumferential reinforcing layer | Yes | Yes | Yes | Yes | Yes |
| Belt angle of cross belt [deg] | 60 | 60 | 60 | 60 | 60 |
| Position of circumferential reinforcing layer relative to cross belts | Between | Between | Between | Between | Between |
| Presence of high-angle belt | None | None | None | None | None |
| Gsh/Gcc | 1.06 | 1.06 | 1.06 | 1.06 | 1.06 |
| De/Dcc | 1.00 | 1.00 | 1.00 | 1.00 | 1.00 |
| Wb2/Wca | 0.80 | 0.80 | 0.80 | 0.80 | 0.80 |
| Ws/Wca | 0.65 | 0.65 | 0.65 | 0.65 | 0.65 |
| TW/SW | 0.87 | 0.87 | 0.87 | 0.87 | 0.87 |
| Yd/Ya | 0.98 | 0.98 | 0.98 | 0.98 | 0.98 |
| Es/E2 | 1.00 | 1.00 | 1.00 | 1.00 | 1.00 |
| Es/E3 | 1.00 | 1.00 | 1.00 | 1.00 | 1.00 |
| λs [%] | 250 | 250 | 250 | 250 | 250 |
| λ2l [%] | 250 | 250 | 250 | 250 | 250 |
| λ3l [%] | 250 | 250 | 250 | 250 | 250 |
| Ebc [MPa] | 3.0 | 2.3 | 2.3 | 2.3 | 2.3 |
| Abc [%] | 300 | 400 | 470 | 470 | 470 |
| TW/Wca | 0.93 | 0.93 | 0.93 | 0.91 | 0.82 |
| Belt durability | 131 | 134 | 135 | 136 | 136 |

PNEUMATIC TIRE

TECHNICAL FIELD

The present technology relates to a pneumatic tire, and more specifically, to a pneumatic tire having improved belt durability.

BACKGROUND

Low profile heavy duty tires mounted on trucks and buses and the like demonstrate suppression of tire radial growth in the center region and demonstrate uniformity of contact pressure distribution in the tire width direction due to the disposition of a circumferential reinforcing layer in the belt layer. Conventional pneumatic tires using such a configuration are disclosed in Japanese Patent Nos. 4642760B, 4663638B and 4663639B, as well as Japanese Unexamined Patent Application Publication Nos. 2006-111217A, 2006-111217A, and 2006-183211A.

However, there is a problem in that tire belt durability performance of the pneumatic tires needs to be improved.

SUMMARY

The present technology provides a pneumatic tire with improved tire belt durability performance in a configuration with a circumferential reinforcing layer.

A pneumatic tire according to the present technology includes a carcass layer, a belt layer that is disposed on an outer side in a tire radial direction of the carcass layer, a tread rubber that is disposed on an outer side in the tire radial direction of the belt layer, at least three circumferential main grooves extending in a tire circumferential direction, and a plurality of land portions that are defined by these circumferential main grooves. In such a pneumatic tire, the belt layer includes an inner-side cross belt and outer-side cross belt having belt angles of not less than 51° and not more than 80° as absolute values with respect to the tire circumferential direction, the belt angles having mutually opposite signs, and a circumferential reinforcing layer having a belt angle that satisfies a range of ±5° with respect to the tire circumferential direction.

In the pneumatic tire of this technology, the pair of cross belts function as high-angle belts to ensure stiffness in the tire width direction. The circumferential reinforcing layer functions as a low-angle belt to ensure stiffness in the tire circumferential direction. This has the advantage of providing an appropriate stiffness balance between the tire circumferential direction and the tire width direction to improve the belt durability performance of the tire.

BRIEF DESCRIPTION OF THE DRAWING(S)

FIGS. 7A-7B include a table showing results of performance testing of pneumatic tires according to embodiments of the present technology.

FIGS. 8A-8B include a table showing results of performance testing of pneumatic tires according to embodiments of the present technology.

FIGS. 9A-9B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

Pneumatic Tire

Figure 1:
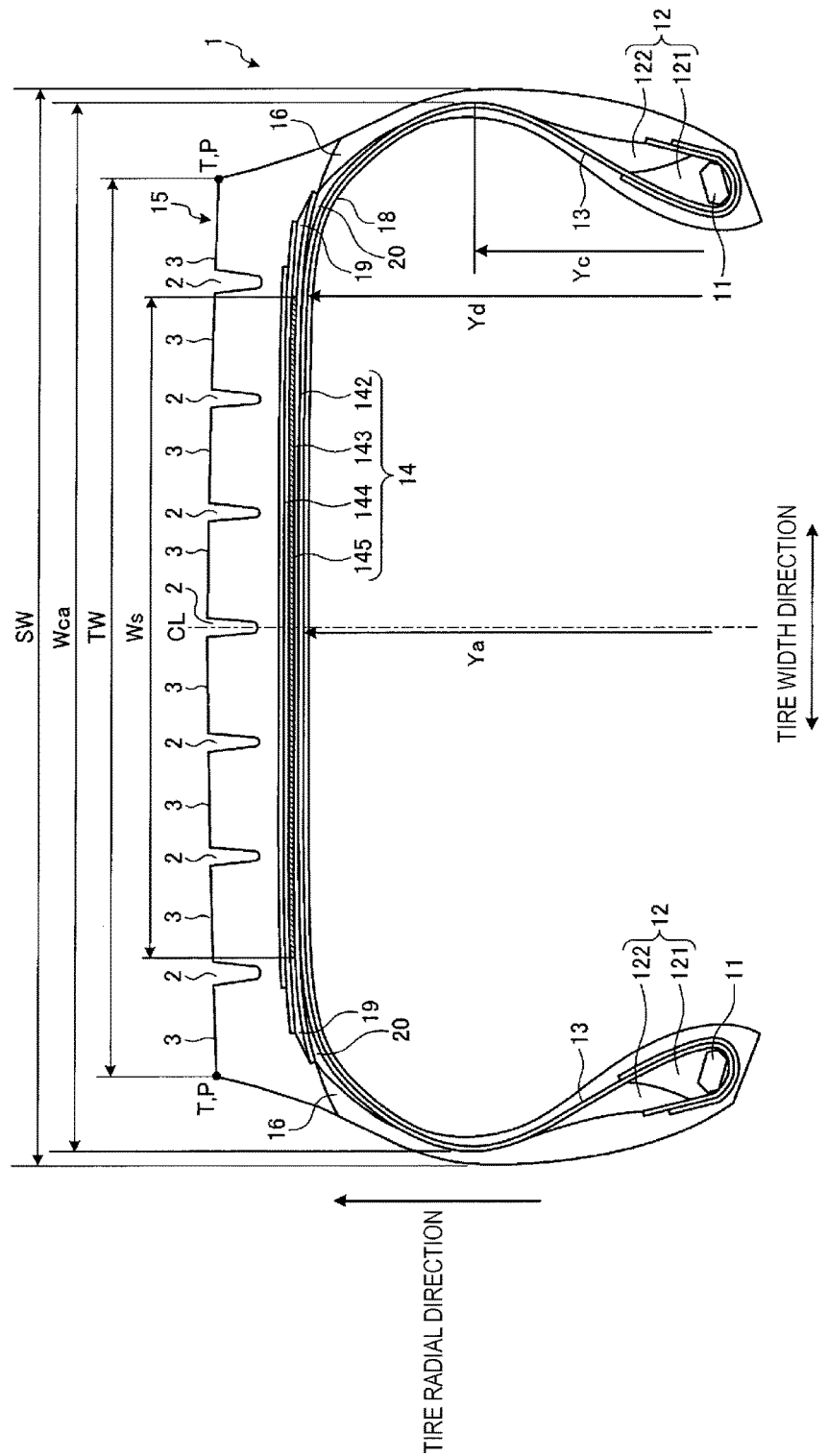
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In FIG. 1, a radial tire for heavy loads that is mounted on trucks, buses, and the like for long-distance transport is illustrated as an example of the pneumatic tire 1. Note that the symbol CL refers to a tire equatorial plane. Moreover, a tread edge P and a tire ground contact edge T are in accord with each other in FIG. 1. The circumferential reinforcing layer 145 in FIG. 1 is indicated by hatching.

A pneumatic tire 1 includes a pair of bead cores 11, 11, a pair of bead fillers 12, 12, a carcass layer 13, a belt layer 14, tread rubber 15, and a pair of side wall rubbers 16, 16 (see FIG. 1).

The pair of bead cores 11, 11 have annular structures and constitute cores of left and right bead portions. The pair of bead fillers 12, 12 are formed from a lower filler 121 and an upper filler 122, and are disposed on a periphery of each of the pair of bead cores 11, 11 in the tire radial direction so as to reinforce the bead portions.

The carcass layer 13 stretches between the left and right side bead cores 11 and 11 in toroidal form, forming a framework for the tire. Additionally, both end portions of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a plurality of belt plies 142, 143, 144, and 145, and disposed to extend over the periphery of the carcass layer 13. A detailed configuration of the belt layer 14 is described below.

The tread rubber 15 is disposed on the periphery in the tire radial direction of the carcass layer 13 and the belt layer 14, and forms a tread portion of the tire. The pair of side wall rubbers 16, 16 are disposed on the outer side in the tire width direction of the carcass layer 13, so as to form left and right side wall portions of the tire.

In the configuration illustrated in FIG. 1, the pneumatic tire 1 includes seven circumferential main grooves 2 that extend in a tire circumferential direction, and eight land portions 3 defined by the circumferential main grooves 2. Additionally, the land portions 3 are formed of rows of blocks that are segmented in the tire circumferential direction by ribs or a plurality of lug grooves that continue in the tire circumferential direction (not illustrated on the drawings).

Here, "circumferential main grooves" refers to circumferential grooves having a groove width of 5.0 mm or greater. The groove widths of the circumferential main grooves are measured excluding notched portions and/or chamfered portions formed at the groove opening portions.

Additionally, in the pneumatic tire 1, the left and right outermost circumferential main grooves 2, 2 in the tire width direction are referred to as outermost circumferential main grooves. Moreover, the left and right land portions 3, 3 on the outer side in the tire width direction that are defined by the left and right outermost circumferential main grooves 2, 2 are referred to as shoulder land portions.

Belt Layer

Figure 2:
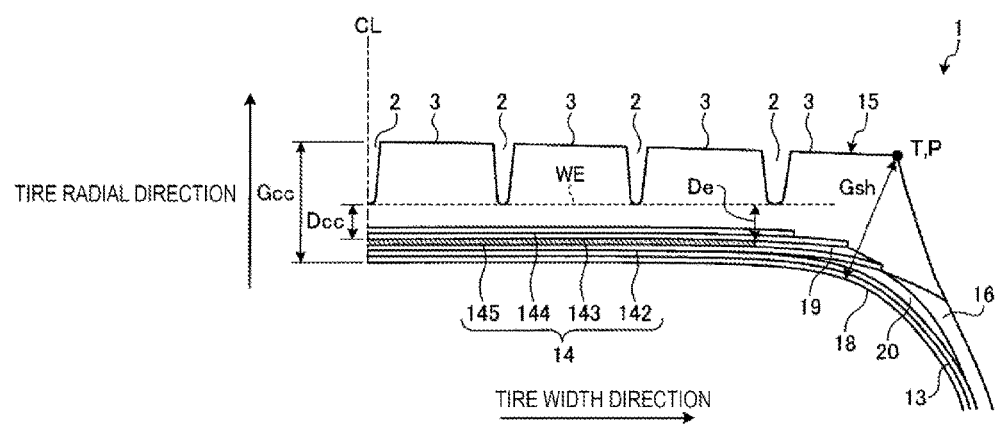
FIG. 2 is an explanatory view illustrating a belt layer of the pneumatic tire depicted in FIG. 1.
Figure 3:
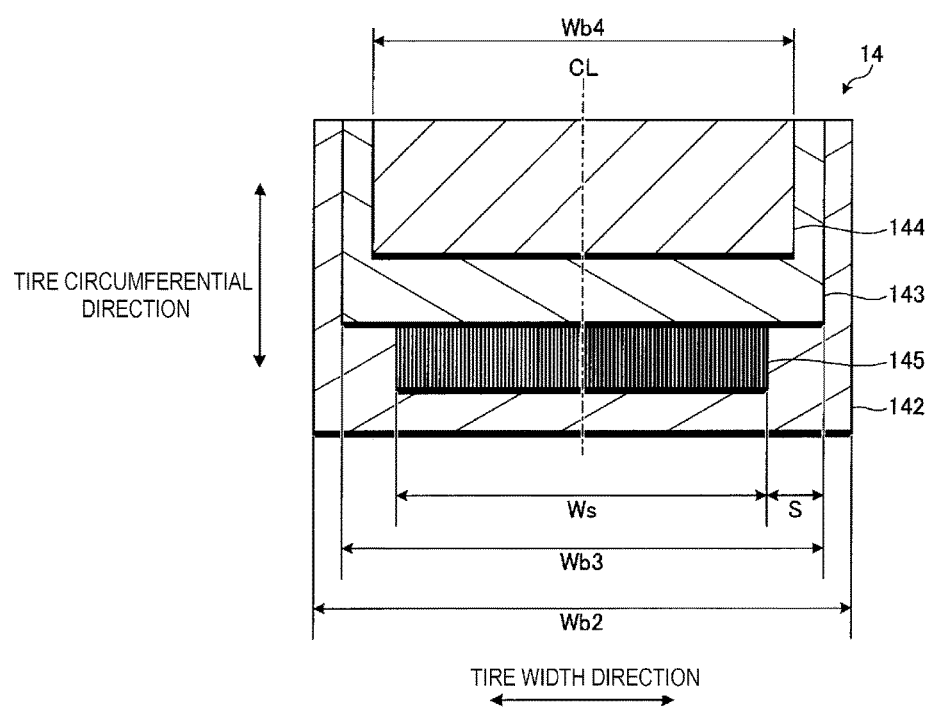
FIG. 3 is an explanatory view illustrating a belt layer of the pneumatic tire depicted in FIG. 1.

FIGS. 2 and 3 are explanatory views illustrating a belt layer of the pneumatic tire depicted in FIG. 1. Of these drawings, FIG. 2 illustrates an area on one side of a tread portion demarcated by the tire equatorial plane CL, and FIG. 3 illustrates a laminated structure of the belt layer 14. Further, the thin lines in the belt plies 142 to 145 in FIG. 3 schematically represent the respective belt cords of the belt plies 142 to 145.

The belt layer 14 is formed by laminating a pair of cross belts 142, 143, a supplemental belt (low-angle belt) 144, and a circumferential reinforcing layer 145, and is disposed so as to be extended over the periphery of the carcass layer 13 (see FIG. 2).

The pair of cross belts 142, 143 are constituted by a plurality of belt cords, the plurality of belt cords being formed from steel or organic fibers covered by a coating rubber, and subjected to a rolling process. Additionally the pair of cross belts 142, 143 preferably have belt angles of not less than 51° and not more than 80° as absolute values (the inclination angle of the fiber direction of the belt cords with respect to the tire circumferential direction), and more preferably have belt angles of not less than 51° and not more than 70°. Additionally, the pair of cross belts 142, 143 have belt angles that are of the opposite sign to each other, and are laminated so that the fiber directions of the belt cords intersect each other (a cross-ply structure). In the following description, the cross belt 142 positioned on the inner side in the tire radial direction is referred to as "inner-side cross belt," and the cross belt 143 positioned on the outer side in the tire radial direction is referred to as "outer-side cross belt." Three or more cross belts may be disposed so as to be laminated (not illustrated on the drawings).

Additionally, the supplemental belt 144 is constituted by a plurality of belt cords, the plurality of belt cords being formed from steel or organic fibers, covered by coating rubber, and subjected to a rolling process. This supplemental belt 144 preferably has a belt angle of not less than 10° and not more than 45° as an absolute value, and more preferably have a belt angle of not less than 15° and not more than 30°. Moreover, the supplemental belt 144 is disposed so as to be laminated on the outer side in the tire radial direction of the pair of cross belts 142, 143. Further, in the structure in FIG. 1, the supplemental belt 144 is laminated on the outermost side in the tire radial direction; thus, the supplemental belt 144 serves as a belt cover for the outer-side cross belt 143.

The circumferential reinforcing layer 145 is constituted by belt cords, the belt cords being formed from steel, covered by coating rubber, and wound in a spiral manner with an inclination satisfying a range of ±5° with respect to the tire circumferential direction. Specifically, the circumferential reinforcing layer 145 is formed by winding one or a plurality of wires in a spiral manner around the periphery of the inner-side cross belt 142. Additionally, the circumferential reinforcing layer 145 is disposed so as to be interposed between the pair of cross belts 142, 143. Additionally, the circumferential reinforcing layer 145 is disposed on the inner side in the tire width direction of the left and right edge portions of the pair of cross belts 142, 143. The stiffness in the tire circumferential direction is reinforced by this circumferential reinforcing layer 145.

Note that, in the pneumatic tire 1, the belt layer 14 may have an edge cover (not illustrated on the drawings). Generally, the edge cover is constituted by a plurality of belt cords, the plurality of belt cords being formed from steel or organic fibers, covered by coating rubber, and subjected to a rolling process. The edge cover has a belt angle, as an absolute value, of no less than 0° and no more than 5°. Additionally, the edge covers are disposed on the outer side in the tire width direction of the left and right edge portions of the outer-side cross belt 143 (or the inner-side cross belt 142). As a result of the fastening effect of the edge cover, the difference in radial growth of a tread center region and a shoulder region is reduced.

Additionally, the inner-side cross belt 142 is disposed adjacent to the carcass layer 13. Therefore, the inner-side cross belt 142 constitutes the innermost layer in the tire radial direction of the belt layer 14, and no other belt ply is disposed between the inner-side cross belt 142 and the carcass layer 13.

Additionally, the inner-side cross belt 142 and the outer-side cross belt 143 sandwich the circumferential reinforcing layer 145 so as for each to be located adjacent to the circumferential reinforcing layer 145. Therefore, no other belt ply is disposed between the inner-side cross belt 142 and outer-side cross belt 143 and the circumferential reinforcing layer 145.

Additionally, in the configuration in FIG. 2, the circumferential reinforcing layer 145 is disposed so as to be interposed between the pair of cross belts 142, 143 (see FIG. 2). However, the circumferential reinforcing layer 145 is not limited as such, and may also disposed on the outer side in the tire radial direction of the pair of cross belts 142, 143 (not illustrated on the drawings). Additionally, the circumferential reinforcing layer 145 may also be disposed on the inner side of the pair of cross belts 142, 143.

Specific Structure of the Supplemental Belt

Additionally, in the pneumatic tire 1, the supplemental belt 144 and outer-side cross belt 143 which are located adjacent to each other have belt angles of the same sign (see FIG. 3). For example, in the structure in FIG. 3, the belt cords of the supplemental belt 144 are inclined to the left side toward the bottom of FIG. 3, and the belt cords of the outer-side cross belt 143 are included to the right side toward the bottom of FIG. 3. Therefore, by being inclined in opposite directions, the belt cords of the supplemental belt 144 and the belt cords of the outer-side cross belt 143 have belt angles of opposite signs.

Further, the belt cords of the supplemental belt 144 and the belt cords of the outer-side cross belt 143 are not limited as such, and may also be inclined in the same direction, thereby having belt angles of the same sign (not illustrated on the drawings).

The supplemental belt 144 also is disposed so as to cover the areas in which the outermost circumferential main grooves 2 are disposed (see FIG. 2). Specifically, the supplemental belt 144 is disposed so as to extend across the entire width of the outermost circumferential main grooves 2. Accordingly, the regions under the outermost circumferential main grooves 2 are reinforced. Further, in a case where the supplemental belt 144 has a split structure (not illustrated on the drawings), the divided portions of the supplemental belt 144 are disposed so as to cover the entire region of the groove widths of the outermost circumferential main grooves 2.

Additionally, a width Wb4 of the supplemental belt 144 and a width Wb3 of the outer-side cross belt 143 have a relationship such that $0.75 \leq Wb4/Wb3 \leq 0.95$ (see FIG. 3). Therefore, the supplemental belt 144 is narrower than the outer-side cross belt 143. Additionally, the Wb4/Wb3 ratio preferably has a relationship such that $0.80 \leq Wb4/Wb3 \leq 0.90$.

Moreover, the width Wb4 of the supplemental belt 144 and a width Ws of the circumferential reinforcing layer 145 have a relationship such that $1.02 \leq Wb4/Ws$ (see FIG. 3). Therefore, the supplemental belt 144 is wider than the circumferential reinforcing layer 145. Additionally, the supplemental belt 144 preferably extends outward in the tire width direction beyond the outermost circumferential main grooves 2 (see FIG. 2). Moreover, the maximum Wb4/Ws ratio is not specifically limited, but is constrained by the relationship between the Wb4/Wb3 ratio described above and a Ws/Wb3 ratio described below.

The width of a belt ply is the distance in the direction of the tire rotational axis between the left and right end portions of each belt ply, measured when the tire is assembled on a standard rim, inflated to a prescribed internal pressure and is in an unloaded state.

Additionally, in a case where a belt ply has a structure that is split in two in the tire width direction (not illustrated on the drawings), the belt ply width is measured as the distance between the outer sides in the tire width direction of the left and right divided portions.

Moreover, in a typical pneumatic tire, each belt ply has a left-right symmetrical structure centered on the tire equatorial plane CL, as illustrated in FIG. 1. Therefore, the distance from the tire equatorial plane CL to the outer end portion of the belt ply in the tire width direction is one half the width of that belt ply.

Herein, "standard rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Prescribed internal pressure" refers to "maximum air pressure" defined by JATMA, a maximum value in "tire load limits at various cold inflation pressures" defined by TRA, and "inflation pressures" defined by ETRTO. Note that "regular load" refers to "maximum load capacity" defined by JATMA, a maximum value in "tire load limits at various cold inflation pressures" defined by TRA, and "load capacity" defined by ETRTO. However, with JATMA, in the case of passenger car tires, the prescribed internal pressure is an air pressure of 180 kPa, and the regular load is 88% of the maximum load capacity.

Additionally, the belt cords of the supplemental belt 144 are constituted by steel wire, and the number of ends in the supplemental belt 144 is not less than 15 ends/50 mm and not more than 25 ends/50 mm.

Improvement of Belt Durability Performance

Recent heavy duty tires mounted on trucks and buses and the like maintain their tread shape due to the tires having a low aspect ratio, while also including circumferential reinforcing layer in the belt layer. Specifically, by disposing the circumferential reinforcing layer at the tread center region, and exploiting the fastening effect thereof, radial growth of the tread is suppressed and the tread shape is maintained.

In such a configuration, the stiffness in the tire width direction of the belt layer is relatively decreased because the stiffness in the tire circumferential direction is further increased by the circumferential reinforcing layer. Thus, there is a problem in that the stiffness balance between the tire circumferential direction and tire width direction becomes uneven, decreasing the belt durability performance of the tire. Such problems become markedly pronounced especially under long-term service conditions at high inner pressures and high loads.

At this point, as described above, the pair of cross belts 142, 143 function as high-angle belts in the pneumatic tire 1 to ensure stiffness in the tire width direction. Additionally, the circumferential reinforcing layer 145 and supplemental belt 144 function as low-angle belts to ensure stiffness in the tire circumferential direction. This provides an appropriate stiffness balance between the tire circumference direction and the tire width direction to improve the belt durability performance of the tire.

Tread Gauge

Additionally, in the pneumatic tire 1, a distance Gcc from the tread profile to the tire inner circumferential surface along the tire equatorial plane CL, and a distance Gsh from the tread edge P to the tire inner circumferential surface have a relationship such that $0.80 \leq Gsh/Gcc \leq 1.20$. Moreover, the Gsh/Gcc ratio preferably has a relationship such that $0.85 \leq Gsh/Gcc \leq 1.10$.

The distance Gcc is measured as the distance from the intersection of the tire equatorial plane CL and the tread profile to the intersection of the tire equatorial plane CL and the tire inner circumferential surface when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured omitting the circumferential main groove 2. The distance Gsh is measured as the length of a perpendicular line from the tread edge P to the tire inner circumferential surface when viewed as a cross-section from the tire meridian direction.

In the configuration illustrated in FIG. 2, the pneumatic tire 1 includes an inner liner 18 on the inner circumferential surface of the carcass layer 13, and the inner liner 18 is disposed so as to extend across the entire region of the tire inner circumferential surface. In such a configuration, the distance Gcc and the distance Gsh are measured on the basis of the outer surface of the inner liner 18 (tire inner circumferential surface).

Additionally, the wear end surface WE of the circumferential main groove 2 is drawn when viewed as a cross-section from the tire meridian direction, as illustrated in FIG. 2. The wear end surface WE refers to the surface estimated from a wear indicator present in the tire. Additionally, the wear end surface WE is measured under the condition of a single tire with the tire in a non-inflated state. In a typical pneumatic tire, the wear end surface WE is on a curve that is roughly parallel with the tread profile.

At this time, a distance Dcc on the tire equatorial plane CL from the circumferential reinforcing layer 145 to the wear end surface WE and a distance De from the end portion of the circumferential reinforcing layer 145 to the wear end surface WE have a relationship such that $0.95 \leq De/Dcc \leq 1.05$.

The distance Dcc and distance De are measured under the condition of a single tire with the tire in a non-inflated state. Additionally, the measurement point on the circumferential reinforcing layer 145 side is defined by a curve connecting the center points of the belt cords that constitute the circumferential reinforcing layer 145, when viewed as a cross-section from the tire meridian direction. Moreover, the end portion of the circumferential reinforcing layer 145 is defined using the belt cord on the outermost side in the tire width direction among the belt cords that constitute the circumferential reinforcing layer 145.

Round Shaped Shoulder Portion

Figure 4:
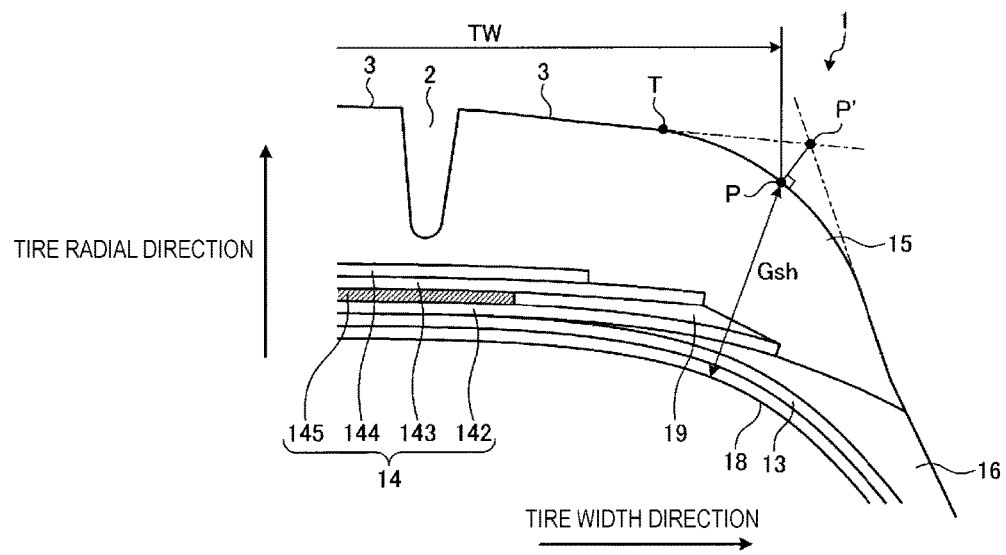
FIG. 4 is an explanatory view illustrating a modified example of the pneumatic tire depicted in FIG. 1.

FIG. 4 is an explanatory view of a modified example of the pneumatic tire depicted in FIG. 1. FIG. 4 illustrates a configuration having a shoulder portion with a round shape.

In the configuration in FIG. 1, the shoulder portion has a square shape, in which the tire ground contact edge T and tread edge P are in accord, as illustrated in FIG. 2. Specifically, in a configuration with a square shaped shoulder portion, the point of the edge portion with a square shape corresponds to the tread edge P.

However, the shoulder portion is not limited as such, and may also have a round shape, as illustrated in FIG. 4. In such a case, an intersection P' is taken from the tread portion profile and the side wall portion profile when viewed as a cross-section from the tire meridian direction, and the tread edge P is taken as the bottom of a perpendicular line drawn from the intersection P' to the shoulder portion. Therefore, the tire ground contact edge T and the tread edge P normally are in mutually different locations.

Additional Data

Additionally, in FIG. 1, the tread width TW and the total tire width SW have a relationship such that $0.83 \leq TW/SW \leq 0.95$. Moreover, it is preferable that the TW/SW ratio satisfy a range of $0.85 \leq TW/SW \leq 0.93$.

The total tire width SW refers to a linear distance (including all portions such as patterns and letters on the tire side surface) between the side walls when the tire is assembled on the standard rim and inflated to the prescribed internal pressure and is in an unloaded state.

The tread width TW is the distance in the direction of the tire rotational axis between the left and right tread edges P, P, measured when the tire is assembled on a standard rim, inflated to a prescribed internal pressure and is in an unloaded state.

Additionally, the tread width TW and cross-sectional width Wca of the carcass layer 13 have a relationship such that $0.82 \leq TW/Wca \leq 0.92$.

The cross-sectional width Wca of the carcass layer 13 refers to a linear distance between the left and right maximum width positions of the carcass layer 13 when the tire is assembled on the standard rim and inflated to the prescribed internal pressure and is in an unloaded state.

Additionally, in FIG. 1, a radius Ya at the highest position of the carcass layer 13 and a radius Yc at the widest position of the carcass layer 13 have a relationship such that $0.80 \leq Yc/Ya \leq 0.90$. Moreover, the radius Ya at the highest position of the carcass layer 13 and a radius Yd of the carcass layer 13 at the end portion of the circumferential reinforcing layer 145 have a relationship such that $0.95 \leq Yd/Ya \leq 1.02$. Accordingly, the cross-sectional profile of the carcass layer 13 is made appropriate, making the tire ground contact pressure distribution uniform.

The radius Ya at the highest position of the carcass layer 13 is measured as a distance from the tire rotational axis to the intersection of the tire equatorial plane CL and the carcass layer 13, when the tire is assembled on the standard rim, inflated to the prescribed internal pressure, and is in an unloaded state.

The radius Yc at the widest location on the carcass layer 13 is measured as a distance from the tire rotational axis to the widest location on the carcass layer 13, when the tire is assembled on a standard rim and filled to a prescribed internal pressure, and is in an unloaded state.

The radius Yd of the carcass layer 13 at the end portion of the circumferential reinforcing layer 145 is measured as a distance from the tire rotational axis to a point Q3 (not illustrated on the drawings), which is the intersection of the carcass layer 13 and a straight line drawn in the tire radial direction from the end portion of the circumferential reinforcing layer 145, when the tire is assembled on the standard rim, inflated to the prescribed internal pressure, and is in an unloaded state.

Additionally, in FIG. 3, the width Wb3 of the narrower cross belt (in FIG. 1, the outer-side cross belt 143) of the inner-side cross belt 142 and outer-side cross belt 143, and the width Ws of the circumferential reinforcing layer 145 preferably have a relationship such that $0.70 \leq Ws/Wb3 \leq 0.90$. This ensures an appropriate width Ws of the circumferential direction reinforcing layer 145.

Widths Wb2, Wb3 of the cross belts 142, 143 are the distances in the tire rotational axis direction between the left and right end portions of each cross belt 142, 143, measured when the tire is assembled on the standard rim, inflated to the prescribed internal pressure and is in an unloaded state.

Additionally, in FIG. 1 and FIG. 3, the width Wb2 of the wider cross belt of the inner-side cross belt 142 and outer-side cross belt 143 (in FIG. 1, the inner-side cross belt 142), and the cross-sectional width Wca of the carcass layer 13 have a relationship such that $0.73 \leq Wb2/Wca \leq 0.89$. Moreover, the Wb2/Wca ratio preferably satisfies a range of $0.78 \leq Wb2/Wca \leq 0.83$.

Moreover, the width Ws of the circumferential reinforcing layer 145 and the cross-sectional width Wca of the carcass layer 13 have a relationship such that $0.60 \leq Ws/Wca \leq 0.70$.

Additionally in the pneumatic tire 1, in FIG. 1, the tread width TW and the width Ws of the circumferential reinforcing layer 145 preferably have a relationship such that $0.70 \leq Ws/TW \leq 0.90$.

Moreover, as illustrated in FIG. 3, the circumferential reinforcing layer 145 is disposed on the inner side in the tire width direction of the left and right edge portions of the narrower cross belt (in FIG. 1, the outer-side cross belt 143) of the pair of cross belts (inner-side cross belt 142 and outer-side cross belt 143). Also, preferably the width Wb3 of the narrower cross belt 143 and a distance S from the edge portion of the circumferential reinforcing layer 145 to the edge portion of the narrower cross belt 143 satisfy a range of $0.03 \leq S/Wb3 \leq 0.12$. This ensures an appropriate distance between the end portion of the width Wb3 of the cross belt 143 and the end portion of the circumferential reinforcing layer 145. This point is the same even if the circumferential reinforcing layer 145 has a divided structure (not illustrated on the drawings).

The distance S of the circumferential reinforcing layer 145 is measured as a distance in the tire width direction when the tire is assembled on the standard rim, inflated to the prescribed internal pressure, and is in an unloaded state.

Further, in the configuration in FIG. 1, the circumferential reinforcing layer 145 is constituted by a single steel wire wound in a spiral manner, as illustrated in FIG. 3. However, the configuration is not limited as such, and the circumferential reinforcing layer 145 may also be constituted by a plurality of wires wound in a spiral manner with the wires arranged side-by-side to each other (multiple wound structure). In this case, preferably, the number of wires is 5 or less. Additionally, the winding width per unit when five wires are wound in a multiple winding manner is preferably no more than 12 mm. Accordingly, a plurality (no less than 2 and no more than 5) of wires can be wound properly with an inclination satisfying a range of ±5° with respect to the tire circumferential direction.

Moreover, the belt cords of the pair of cross belts 142, 143 are constituted by steel wire, and the number of ends in the pair of cross belts 142, 143 preferably is not less than 18 ends/50 mm and not more than 28 ends/50 mm, and more preferably is not less than 20 ends/50 mm and not more than 25 ends/50 mm. Also, the belt cords of the circumferential reinforcing layer 145 are constituted by steel wire, and the number of ends in the circumferential reinforcing layer 145 preferably is not less than 17 ends/50 mm and not more than 30 ends/50 mm. This ensures appropriate strengths of the belt plies 142, 143, 145.

Moreover, moduli E2, E3 at 100% elongation of the coating rubbers of the pair of cross belts 142, 143, and the modulus Es at 100% elongation of the coating rubber of the circumferential reinforcing layer 145 preferably have a relationship such that $0.90 \leq Es/E2 \leq 1.10$ and $0.90 \leq Es/E3 \leq 1.10$. Moreover, the modulus Es at 100% elongation of the coating rubber of the circumferential reinforcing layer 145 preferably satisfies ranges such that $4.5 \text{ MPa} \leq Es \leq 7.5 \text{ MPa}$. Accordingly, the moduli of the belt plies 142, 143, 145 are made appropriate.

The modulus at 100% elongation is measured in a tensile test at ambient temperature in conformance with JIS K6251 (using No. 3 dumbbell).

Moreover, breaking elongations $\lambda 2$, $\lambda 3$ of the coating rubbers of the pair of cross belts 142, 143 are both preferably equal to or greater than 200%. Moreover, a breaking elongation $\lambda s$ of the coating rubber of the circumferential reinforcing layer 145 is preferably equal to or greater than 200%. This ensures an appropriate durability of the belt plies 142, 143, 145.

Breaking elongation is measured by performing a tensile test on a test specimen having 1B shape (dumbbell shape with a thickness of 3 mm) specified in JIS K7162 using a tensile tester (INSTRON5585H manufactured by Instron Corp.) conforming to JIS K7161 at a pulling speed of 2 mm/min.

The elongation of the belt cords is preferably not less than 1.0% and not more than 2.5% when the tensile load on the belt cords as components that constitute the circumferential reinforcing layer 145 is from 100 N to 300 N, and is preferably not less than 0.5% and not more than 2.0% when the tensile load is from 500 N to 1000 N as a tire (when removed from the tire). The belt cords (high elongation steel wire) have a better elongation ratio than that of a normal steel wire when a light load is applied; thus they can withstand loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Additionally, in the pneumatic tire 1, the breaking elongation of the tread rubber 15 preferably is equal to or greater than 400%, and more preferably is equal to or greater than 450%. Accordingly, the strength of the tread rubber 15 can be properly ensured. Further, the maximum breaking elongation of the tread rubber 15 is not specifically limited, but is constrained by the type of rubber compound of the tread rubber 15.

Additionally, in this pneumatic tire 1, the hardness of the tread rubber 15 preferably is equal to or greater than 60. This ensures an appropriate strength of the tread rubber 15. Further, the maximum hardness of the tread rubber 15 is not specifically limited, but is constrained by the type of rubber compound of the tread rubber 15.

Here, "rubber hardness" refers to JIS A hardness in accordance with JIS K6263.

Belt Cushion

As illustrated in FIG. 2, the pneumatic tire 1 includes a belt cushion 20. The belt cushion 20 is disposed so as to be interposed between the carcass layer 13 and the end portion of the cross belt 142 on the inner side in the tire radial direction of the pair of cross belts 142, 143. For example, in the configuration in FIG. 2, the end portion on the outer side in the tire radial direction of the belt cushion 20 is inserted between the end portion of the cross belt 142, and the carcass layer 13. Additionally, the belt cushion 20 extends inward in the tire radial direction along the carcass layer 13 and is disposed so as to be interposed between the carcass layer 13 and a sidewall rubber 16. Moreover, a pair of left and right belt cushions 20 are respectively disposed at the left and right side wall portions of the tire.

Additionally, a modulus Ebc at 100% elongation of the belt cushion 20 satisfies a range of $1.5 \text{ MPa} \leq Ebc \leq 3.0 \text{ MPa}$. Having the modulus Ebc satisfying such a range, the belt cushion 20 exhibits the stress relief action, thereby suppressing separation of the periphery rubber at the end portions of the cross belt 142.

Moreover, a breaking elongation $\lambda bc$ of the belt cushion 20 satisfies a range of $\lambda bc \geq 400\%$. This ensures an appropriate durability of the belt cushion 20.

Belt Edge Cushion Two-Color Structure

Figure 5:
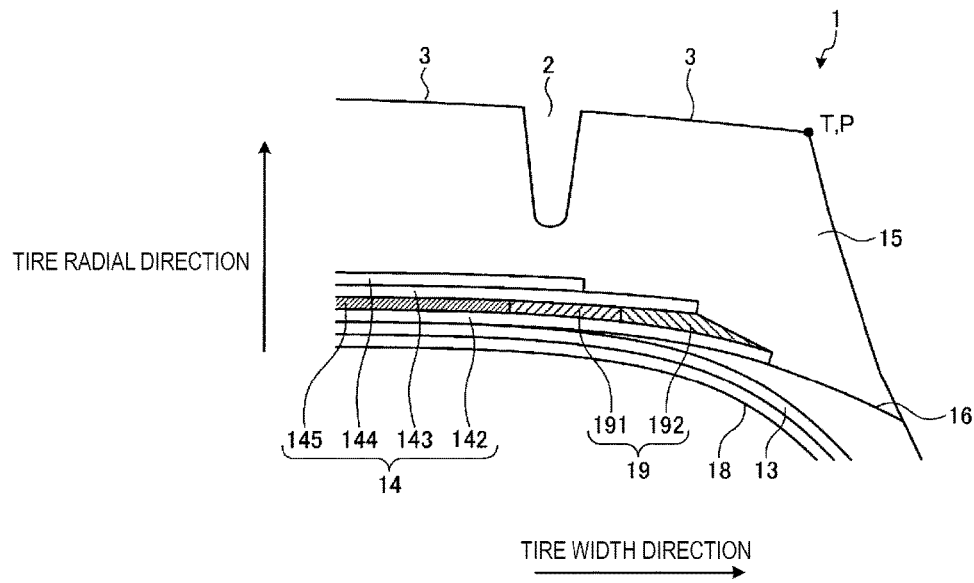
FIG. 5 is an explanatory view illustrating a modified example of the pneumatic tire depicted in FIG. 1.

FIG. 5 is an explanatory view of a modified example of the pneumatic tire depicted in FIG. 1. FIG. 5 is an enlarged view of an outer end portion in the tire width direction of the belt layer 14. In FIG. 5, the circumferential reinforcing layer 145 and the belt edge cushion 19 are indicated by hatching.

In the configuration illustrated in FIG. 1, the circumferential reinforcing layer 145 is disposed on the inner side in the tire width direction of the left and right edge portions of the narrower cross belt 143 of the pair of cross belts 142, 143. The belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side in the tire width direction of the circumferential reinforcing layer 145 so as to be located adjacent to the circumferential reinforcing layer 145, and extends from the outer end portion of the circumferential reinforcing layer 145 in the tire width direction to the outer end portions of the pair of cross belts 142, 143 in the tire width direction.

In the configuration illustrated in FIG. 1, the belt edge cushion 19 has a structure that is thicker as a whole than that of the circumferential reinforcing layer 145 due to the thickness increasing toward the outer side in the tire width direction. The belt edge cushion 19 has a modulus E at 100% elongation that is lower than that of the coating rubbers of the cross belts 142, 143. Specifically, the modulus E at 100% elongation of the belt edge cushion 19 and a modulus Eco of the coating rubber have a relationship such that $0.60 \leq E/$ Eco≤0.95. Accordingly, the occurrence of separation of rubber materials between the pair of cross belts 142, 143 and in a region on the outer side in the tire width direction of the circumferential reinforcing layer 145 is suppressed.

Conversely, according to the configuration in FIG. 5, the belt edge cushion 19 in the configuration in FIG. 1 has a two-color structure composed of a stress relief rubber 191 and an end portion relief rubber 192. The stress relief rubber 191 is disposed between the pair of cross belts 142, 143 and on the outer side in the tire width direction of the circumferential reinforcing layer 145 so as to be located adjacent to the circumferential reinforcing layer 145. The end portion relief rubber 192 is disposed between the pair of cross belts 142, 143, on the outer side in the tire width direction of the stress relief rubber 191, and at a position corresponding to the edge portions of the pair of cross belts 142, 143 so as to be located adjacent to the stress relief rubber 191. Therefore, when viewed as a cross-section from the tire meridian direction, the belt edge cushion 19 has a structure wherein the stress relief rubber 191 and the end portion relief rubber 192 are disposed side by side in the tire width direction so as to fill a region from the outer end portion in the tire width direction of the circumferential reinforcing layer 145 to the edge portion of the pair of cross belts 142, 143.

Additionally, a modulus Ein at 100% elongation of the stress relief rubber 191 and the modulus Es at 100% elongation of the coating rubber of the circumferential reinforcing layer 145 have a relationship such that Ein<Es in the configuration in FIG. 5. Specifically, the modulus Ein of the stress relief rubber 191 and the modulus Es of the circumferential reinforcing layer 145 preferably have a relationship such that 0.6≤Ein/Es≤0.9.

Moreover, the modulus Ein at 100% elongation of the stress relief rubber 191 and the modulus Eco at 100% elongation of the coating rubbers of the cross belts 142, 143 have a relationship of Ein<Eco in the configuration in FIG. 5. Specifically, the modulus Ein of the stress relief rubber 191 and the modulus Eco of the coating rubber preferably have a relationship such that 0.6≤Ein/Eco≤0.9.

Additionally a modulus Eout at 100% elongation of the end portion relief rubber 192 and the modulus Ein at 100% elongation of the stress relief rubber 191 preferably have a relationship such that Eout<Ein in the configuration in FIG. 5. Additionally, the modulus Ein at 100% elongation of the stress relief rubber 191 preferably satisfies a range of 4.0 MPa≤Ein≤5.5 MPa.

In the configuration of FIG. 5, since the stress relief rubber 191 is disposed on the outer side in the tire width direction of the circumferential reinforcing layer 145, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the periphery rubbers at the edge portions of the cross belts 142, 143 is alleviated. Accordingly, separation of the periphery rubber of the circumferential reinforcing layer 145 is suppressed.

Configuration with Supplemental Belt as Innermost Layer

Figure 6:
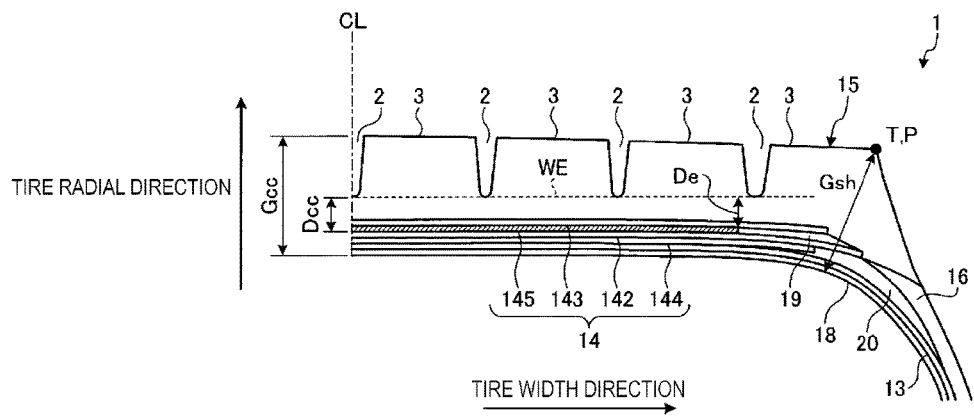
FIG. 6 is an explanatory view illustrating a modified example of the pneumatic tire depicted in FIG. 1.

FIG. 6 is an explanatory view of a modified example of the pneumatic tire depicted in FIG. 1. FIG. 1 illustrates a one-sided region of the tread portion bounded by the tire equatorial plane CL.

As illustrated in FIG. 2 and FIG. 3, the supplemental belt 144 is disposed as the outermost layer of the belt layer 14 in the configuration in FIG. 1. In this way, the inner-side cross belt 142 is disposed as the innermost layer of the belt layer 14, adjacent to the carcass layer 13.

However, not limited as such, the supplemental belt 144 may also be disposed so as to be interposed between, and adjacent to, the carcass layer 13 and inner-side cross belt 142, as illustrated in FIG. 6. Namely, in the configuration in FIG. 6, the belt layer 14 is constructed by disposing the supplemental belt 144 on the outer periphery of the carcass layer 13, laminating the inner-side cross belt 142 onto the outer periphery of the supplemental belt 144, and laminating the circumferential reinforcing layer 145 and outer-side cross belt 143 in sequence on the outer periphery of the inner-side cross belt 142.

Effect

As described above, the pneumatic tire 1 includes the carcass layer 13, the belt layer 14 disposed on the outer side in the tire radial direction of the carcass layer 13, and the tread rubber 15 disposed on the outer side in the tire radial direction of the belt layer 14 (see FIG. 1). The pneumatic tire 1 also includes at least three circumferential main grooves 2 extending in the tire circumferential direction, and a plurality of land portions 3 that are defined by these circumferential main grooves 2. Additionally, the belt layer 14 includes an inner-side cross belt 142 and outer-side cross belt 143 having belt angles of not less than 51° and not more than 80° as absolute values with respect to the tire circumferential direction, the belt angles having mutually opposite signs, and a circumferential reinforcing layer 145 having a belt angle satisfying a range of ±5° with respect to the tire circumferential direction (see FIG. 2 and FIG. 3).

In this configuration, the pair of cross belts 142, 143 functions as a high-angle belt to ensure stiffness in the tire width direction. Additionally, the circumferential reinforcing layer 145 functions as a low-angle belt to ensure stiffness in the tire circumferential direction. This has the advantage of providing an appropriate stiffness balance between the tire circumferential direction and the tire width direction to improve the belt durability performance of the tire.

In particular, since the pair of cross belts 142, 143 functions as a high-angle belt in the configuration described above, other high-angle belts (for example, a belt ply having a belt angle of not less than 45° and not more than 70° as an absolute value, and disposed between a carcass layer and an inner-side cross belt) can be omitted. This has the advantage of making the tire more lightweight.

Additionally, in the pneumatic tire 1, the circumferential reinforcing layer 145 is disposed between the inner-side cross belt 142 and the outer-side cross belt 143 (see FIG. 2 and FIG. 3). In such a configuration, the pair of cross belts 142, 143, with belt angles highly inclined in the tire width direction, and the circumferential reinforcing layer 145, with a belt angle highly inclined in the tire circumferential direction, are laminated alternating in the tire radial direction. In this way, the stiffness distribution in the tire radial direction in these belt plies 142, 143, 145 is made more uniform than in a configuration in which the circumferential reinforcing layer is disposed on the inner side or outer side in the tire radial direction of the pair of cross belts (not illustrated on the drawings). This has the advantage of improving the belt durability of the tire.

In the pneumatic tire 1, the distance Gcc from the tread profile to the tire inner circumferential surface along the tire equatorial plane CL, and the distance Gsh from the tread edge P to the tire inner circumferential surface have a relationship such that Gsh/Gcc≤1.20 (see FIG. 2). In such a configuration, making the distance Gsh smaller has the advantage of reducing the rubber volume at the end portions of the cross belts 142, 143 to improve the heat buildup characteristics.

Additionally, in the pneumatic tire 1, the distance Dcc on the tire equatorial plane CL from the circumferential reinforcing layer 145 to the wear end surface WE and the distance De from the end portion of the circumferential reinforcing layer 145 to the wear end surface WE have a relationship such that 0.95≤De/Dcc≤1.05. Since appropriate distances Dcc, De are provided for the circumferential reinforcing layer 145 relative to the wear end surface WE in such a configuration, strain in the circumferential reinforcing layer 145 is reduced when the tire is in contact with the ground. This has the advantage of improving belt durability.

Additionally in the pneumatic tire 1, a width Wb2 of the wider cross belt of the inner-side cross belt 142 and the outer-side cross belt 143 (in FIG. 1, the inner-side cross belt 142), and the cross-sectional width Wca of the carcass layer 13 have a relationship such that 0.73≤Wb2/Wca≤0.89. This has the advantage of providing a suitable Wb2/Wca ratio. Namely, the relationship satisfying 0.74≤Wb2 ensures a wide width Wb2 for the cross belt, and ensures stiffness in the tire circumferential direction. Additionally, the relationship satisfying Wb2/Wca≤0.89 prevents stiffness from being too great in the tire circumferential direction.

Moreover, in the pneumatic tire 1, a width Ws of the circumferential reinforcing layer 145 and a cross-sectional width Wca of the carcass layer 13 have a relationship such that 0.60≤Ws/Wca≤0.70 (see FIG. 1). This has the advantage of providing an appropriate Ws/Wca ratio. Namely, the relationship satisfying 0.60≤Ws/Wca ensures the width Ws of the circumferential reinforcing layer 145, suppresses rising of the tread portions in the vicinity of the end portions of the circumferential reinforcing layer 145 (¼ of the region of the tread width TW), and ensures appropriate ground contact pressure in the shoulder land portions 3. Additionally, the relationship satisfying Ws/Wca≤0.70 alleviates the difference in radii at the center portion and end portion of the circumferential reinforcing layer 145, reduces the tension on the circumferential reinforcing layer 145 originating in repetitive strain during tire rolling, and suppresses fatigue rupture of the belt cords at the edge portions of the circumferential reinforcing layer 145.

Moreover, in the pneumatic tire 1, the tread width TW and the total tire width SW have a relationship such that 0.83≤TW/SW≤0.95 (see FIG. 1). This has the advantage of making the ground contact pressure uniform in the tire width direction when the tire is in contact with the ground to improve belt durability.

Additionally, in the pneumatic tire 1, the radius Ya at the highest position of the carcass layer 13 and the radius Yd of the carcass layer 13 at the end portion of the circumferential reinforcing layer 145 have a relationship such that 0.95≤Yd/Ya≤1.02 (see FIG. 1). This has the advantage of providing an appropriate cross-sectional profile of the carcass layer 13 to make the ground contact pressure distribution of the tire uniform.

Additionally, in the pneumatic tire 1, moduli E2, E3 at 100% elongation of the coating rubbers of the inner-side cross belt 142 and outer-side cross belt 143, and the modulus Es at 100% elongation of the coating rubber of the circumferential reinforcing layer 145 have a relationship such that 0.90≤Es/E2≤1.10 and 0.90≤Es/E3≤1.10. This has the advantage of providing an appropriate Es/E2 ratio and Es/E3 ratio to improve a threshold value at which tire failure is reached.

Moreover, in the pneumatic tire 1, the breaking elongation λs of the coating rubber of the circumferential reinforcing layer 145 satisfies a range of λs≥200%. This has the advantage of providing an appropriate breaking elongation λs for the circumferential reinforcing layer 145 to improve the threshold value at which tire failure is reached.

Moreover, in the pneumatic tire 1, breaking elongations λ2, λ3 of the coating rubbers of the inner-side cross belt 142 and outer-side cross belt 143 satisfy ranges of λ2≥200% and λ3≥200%. This has the advantage of providing appropriate breaking elongations λ2, λ3 for the pair of cross belts 142, 143 to improve the threshold value at which tire failure is reached.

Additionally, the pneumatic tire 1 includes the belt cushion 20 disposed so as to be interposed between the carcass layer 13 and the end portion of the cross belt 142 on the inner side in the tire radial direction of the pair of cross belts 142, 143 (see FIG. 1 and FIG. 2). Additionally, the modulus Ebc at 100% elongation of the belt cushion 20 satisfies a range of 1.5 MPa≤Ebc≤3.0 MPa. In such a configuration, the belt cushion 20 is disposed between the carcass layer 13 and the cross belt 142 on the inner side in the tire radial direction, and the modulus Ebc of the belt cushion 20 is made appropriate. This has the advantage of making the belt cushion 20 exhibit the stress relief action to suppress separation of the periphery rubber at the end portions of the cross belt 142. Specifically, the relationship satisfying 1.5 MPa≤Ebc ensures appropriate durability for the belt cushion 20, and the relationship satisfying Ebc≤3.0 MPa ensures appropriate stress relief action for the belt cushion 20.

Additionally, in the pneumatic tire 1, the breaking elongation λbc of the belt cushion 20 satisfies a range of λbc≥400%. This has the advantage of ensuring appropriate durability for the belt cushion 20.

Additionally, in the pneumatic tire 1, the tread width TW and the cross-sectional width Wca of the carcass layer 13 have a relationship such that 0.82≤TW/Wca≤0.92 (see FIG. 1). In such a configuration, radial growth in the center region is suppressed due to the belt layer 14 having the circumferential reinforcing layer 145. Furthermore, a difference in radial growth in the center region and shoulder region is reduced and the ground contact pressure distribution in the tire width direction is made uniform due to the TW/Wca ratio satisfying the above range. This has the advantage of making the ground contact pressure of the tire uniform. Specifically, the air volume inside the tire is ensured and deformation is suppressed due to the relationship satisfying 0.82≤TW/Wca. Moreover, the relationship satisfying TW/Wca≤0.92 has the advantage of suppressing rising of the shoulder portion to make the ground contact pressure distribution uniform.

Additionally, the pneumatic tire 1 includes the supplemental belt 144 that is disposed on the outer side in the tire radial direction of the outer-side cross belt 143, and a laminate constituted by the inner-side cross belt 142, outer-side cross belt 143, circumferential reinforcing layer 145, and supplemental belt 144 (the belt layer 14 in FIG. 2 and FIG. 3) is disposed adjacent to the carcass layer 13 (see FIG. 2 and FIG. 3). Such a configuration has the advantage of being able to make the tire more lightweight since one belt can be eliminated, while maintaining the same functionality, compared with, e.g., a configuration having a high-angle belt (not less than 45° and not more than 70° as an absolute value) between this laminate and the carcass layer.

Also, in the pneumatic tire 1, the belt cords that constitute the circumferential reinforcing layer 145 are constituted by steel wire, and the circumferential reinforcing layer 145 has not less than 17 ends/50 mm and not more than 30 ends/50 mm. This has the advantage of ensuring an appropriate effect of suppressing radial growth in the center region due to the circumferential reinforcing layer 145.

In the pneumatic tire 1, the elongation of the belt cords is preferably not less than 1.0% and not more than 2.5% when the tensile load on the belt cords as components that constitute the circumferential reinforcing layer 145 is from 100 N to 300 N. This has the advantage of ensuring an appropriate effect of suppressing radial growth in the center region of the tread due to the circumferential reinforcing layer 145.

In the pneumatic tire 1, the elongation of the belt cords is not less than 0.5% and not more than 2.0% when the tensile load on the belt cords as components that constitute the circumferential reinforcing layer 145 is from 500 N to 1000 N. This has the advantage of ensuring an appropriate effect of suppressing radial growth in the center region due to the circumferential reinforcing layer 145.

Additionally, in the pneumatic tire 1, the circumferential reinforcing layer 145 is disposed on the inner side in the tire width direction of the left and right edge portions of the narrower cross belt (in FIG. 1, the outer-side cross belt 143) of the pair of cross belts (inner-side cross belt 142 and outer-side cross belt 143) (see FIG. 3). The pneumatic tire 1 includes the stress relief rubber 191 disposed between the pair of cross belts 142, 143 and on the outer side in the tire width direction of the circumferential reinforcing layer 145 so as to be located adjacent to the circumferential reinforcing layer 145, and the end portion relief rubber 192 disposed between the pair of cross belts 142, 143, on the outer side in the tire width direction of the stress relief rubber 191, and at a position corresponding to the edge portions of the pair of cross belts 142, 143 so as to be located adjacent to the stress relief rubber 191 (see FIG. 5).

In such a configuration, there is an advantage that fatigue rupture of the periphery rubber at the edge portion of the circumferential reinforcing layer 145 is suppressed due to the circumferential reinforcing layer 145 being disposed on the inner side in the tire width direction of the left and right edge portions of the narrower cross belt 143 of the pair of cross belts 142, 143. Since the stress relief rubber 191 is disposed on the outer side in the tire width direction of the circumferential reinforcing layer 145, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the periphery rubbers at the edge portions of the cross belts 142, 143 is alleviated. Accordingly, there is an advantage that separation of the periphery rubber of the circumferential reinforcing layer 145 is suppressed.

Additionally, in the pneumatic tire 1, the modulus Ein at 100% elongation of the stress relief rubber 191 and the modulus Eco at 100% elongation of the coating rubber of the pair of cross belts (inner-side cross belt 142 and outer-side cross belt 143) have a relationship such that Ein<Eco (see FIG. 5). This has the advantage of providing an appropriate modulus Ein of the stress relief rubber 191 to alleviate the shearing strain of the periphery rubber between the edge portion of the circumferential reinforcing layer 145 and the cross belts 142, 143.

Additionally, in the pneumatic tire 1, the modulus Ein at 100% elongation of the stress relief rubber 191 and the modulus Eco at 100% elongation of the coating rubber of the pair of cross belts 142, 143 (inner-side cross belt 142 and outer-side cross belt 143) have a relationship such that 0.60≤Ein/Eco≤0.90 (see FIG. 5). This has the advantage of providing an appropriate modulus Ein of the stress relief rubber 191 to alleviate the shearing strain of the periphery rubber between the edge portion of the circumferential reinforcing layer 145 and the cross belts 142, 143.

Additionally, in the pneumatic tire 1, the modulus Ein at 100% elongation of the stress relief rubber 191 satisfies 4.0 MPa≤Ein≤5.5 MPa (see FIG. 5). This has the advantage of providing an appropriate modulus Ein of the stress relief rubber 191 to alleviate the shearing strain of the periphery rubber between the edge portion of the circumferential reinforcing layer 145 and the cross belts 142, 143.

Moreover, in the pneumatic tire 1, the circumferential reinforcing layer 145 is disposed on the inner side in the tire width direction of the left and right edge portions of the narrower cross belt (in FIG. 1, the outer-side cross belt 143) of the pair of cross belts (inner-side cross belt 142 and outer-side cross belt 143) (see FIG. 1). Additionally, the width Wb3 of the narrower cross belt 143 and the distance S from the edge portion of the circumferential reinforcing layer 145 to the edge portion of the narrower cross belt 143 satisfy the range of 0.03≤S/Wb3≤0.12 (see FIG. 3). This has the advantage of providing an appropriate positional relationship S/Wb3 between the edge portions of the cross belts 142, 143 and the edge portions of the circumferential reinforcing layer 145. Specifically, the relationship satisfying 0.03≤S/Wb3 ensures an appropriate distance between the end portions of the circumferential reinforcing layer 145 and the end portions of the cross belt 143 to suppress the separation of the periphery rubbers at the end portions of these belt plies 145, 143. Additionally, the relationship satisfying S/Wb3≤0.12 ensures the width Ws of the circumferential reinforcing layer 145 relative to the width Wb3 of the cross belt 143 to ensure an appropriate fastening effect from the circumferential reinforcing layer 145.

Target of Application

The pneumatic tire 1 is preferably applied to a heavy duty tire with an aspect ratio of not less than 40% and not more than 75% when assembled on the regular rim, inflated to the prescribed internal pressure, and loaded with the regular load. A heavy duty tire has a higher load under use than a passenger car tire. Thus, a difference in radius occurs easily between the region where the circumferential reinforcing layer is disposed and the region on the outer side in the tire width direction of the circumferential reinforcing layer. Moreover, a ground contact shape having an hourglass shape occurs easily in the tire having the above-mentioned low aspect ratio. Therefore, making such heavy duty tires the object of applications allows for pronounced demonstration of the effects of the circumferential reinforcing layer 145.

Working Examples

FIGS. 7A to 9B are tables showing results of performance testing of pneumatic tires according to embodiments of the present technology.

In the performance testing, a plurality of mutually differing pneumatic tires were evaluated for belt durability performance. In the evaluation, test tires having a size of 315/60R22.5 were assembled on rims having a size of 22.5"×9.00" and inflated to 900 kPa air pressure.

Additionally, an indoor drum testing machine was used, under conditions of 45 km/h test tire running speed and ±2° slip angle. Additionally, the running distance until tire failure was measured while increasing the load from a 34.81 kN load by 5% (1.74 kN) every 12 hours. Evaluations were performed by indexing the measurement results with the conventional example set as the standard score (100). In these evaluations, higher scores were preferable. Specifically, an evaluation of 105 or greater (+5 points or more over the standard value of 100) indicates sufficient superiority over the conventional example, and an evaluation of 110 or greater indicates dramatic superiority over the conventional example.

The test tires of Working Example 1 had the configuration illustrated in FIGS. 1 to 3. Additionally, principal dimensions were set at TW=275 mm, Gcc=32.8 mm, Dcc=11.2 mm, and Wca=320 mm. The test tires in Working Examples 2 to 36 were modified examples of the test tire in Working Example 1.

The test tire of the conventional example does not include the circumferential reinforcing layer 145 in the configuration in FIG. 1 to FIG. 3. Additionally, a high-angle belt with a 60° belt angle is included between the inner-side cross belt 142 and the carcass layer 13. Therefore, the belt layer 14 has a structure in which four belt plies are laminated. Moreover, the pair of cross belts 142, 143 have belt angles (not more than 45°) closer to the tire circumferential direction.

The test tire in the comparative example, in the configurations in FIG. 1 to FIG. 3, include a high-angle belt with a 60° belt angle between the inner-side cross belt 142 and the carcass layer 13. Therefore, the belt layer 14 has a structure in which five belt plies are laminated. Moreover, the pair of cross belts 142, 143 have belt angles (not less than 45°) closer to the tire circumferential direction.

As shown in the test results, it can be seen that the belt durability performance of the tire is improved in the test tires of Working Examples 1 to 36.

What is claimed is:

1. A pneumatic tire having a carcass layer, a belt layer disposed on an outer side in a tire radial direction of the carcass layer, a tread rubber disposed on an outer side in the tire radial direction of the belt layer, at least three circumferential main grooves extending in a tire circumferential direction, and a plurality of land portions defined by the circumferential main grooves, wherein
   the belt layer includes:
   an inner-side cross belt and outer-side cross belt having belt angles of not less than 51° and not more than 80° as absolute values with respect to a tire circumferential direction, the belt angles having mutually opposite signs; and
   a circumferential reinforcing layer having a belt angle satisfying a range of ±5° with respect to the tire circumferential direction;
   wherein a width Wb2 of a wider cross belt of the inner-side cross belt and the outer-side cross belt, and a cross-sectional width Wca of the carcass layer have a relationship such that 0.73≤Wb2/Wca≤0.89.

2. The pneumatic tire according to claim 1, wherein the circumferential reinforcing layer is disposed between the inner-side cross belt and the outer-side cross belt.

3. The pneumatic tire according to claim 1, wherein a distance Gcc from a tread profile to a tire inner circumferential surface along a tire equatorial plane, and a distance Gsh from a tread edge to the tire inner circumferential surface have a relationship such that Gsh/Gcc≤1.20.

4. The pneumatic tire according to claim 1, wherein, upon a wear end surface WE of the circumferential main groove being drawn when viewed as a cross-section from a tire meridian direction,
   a distance Dcc on the tire equatorial plane from the circumferential reinforcing layer to the wear end surface WE and a distance De from an end portion of the circumferential reinforcing layer to the wear end surface WE have a relationship such that 0.95≤De/Dcc≤1.05.

5. The pneumatic tire according to claim 1, wherein a width Ws of the circumferential reinforcing layer and the cross-sectional width Wca of the carcass layer have a relationship such that 0.60≤Ws/Wca≤0.70.

6. The pneumatic tire according to claim 1, wherein a tread width TW and a total tire width SW have a relationship such that 0.83≤TW/SW≤0.95.

7. The pneumatic tire according to claim 1, wherein a radius Ya at a highest position of the carcass layer and a radius Yd of the carcass layer at the end portion of the circumferential reinforcing layer have a relationship such that 0.95≤Yd/Ya≤1.02.

8. The pneumatic tire according to claim 1, wherein moduli E2, E3 at 100% elongation of coating rubbers of the inner-side cross belt and outer-side cross belt, and a modulus Es at 100% elongation of a coating rubber of the circumferential reinforcing layer have a relationship such that 0.90≤Es/E2≤1.10 and 0.90≤Es/E3≤1.10.

9. The pneumatic tire according to claim 1, wherein a breaking elongation λs of a coating rubber of the circumferential reinforcing layer satisfies a range of λs≥200%.

10. The pneumatic tire according to claim 1, wherein breaking elongations λ2, λ3 of coating rubbers of the inner-side cross belt and outer-side cross belt satisfy ranges of λ2≥200% and κ3≥200%.

11. The pneumatic tire according to claim 1, further comprising a belt cushion disposed so as to be interposed between the carcass layer and an end portion of a cross belt of the pair of cross belts, the cross belt being disposed on an inner side in the tire radial direction, wherein
    a modulus Ebc at 100% elongation of the belt cushion satisfies a range of 1.5 MPa≤Ebc≤3.0 MPa.

12. The pneumatic tire according to claim 11, wherein a breaking elongation λbc of the belt cushion satisfies a range of λbc≥400%.

13. The pneumatic tire according to claim 1, wherein the tread width TW and the cross-sectional width Wca of the carcass layer have a relationship such that 0.82≤TW/Wca≤0.92.

14. The pneumatic tire according to claim 1, further comprising a supplemental belt disposed on an outer side in the tire radial direction of the outer-side cross belt, wherein
    a laminate constituted by the inner-side cross belt, the outer-side cross belt, the circumferential reinforcing layer, and the supplemental belt is disposed adjacent to the carcass layer.

* * * * *